US012602564B2

(12) United States Patent
Mueller

(10) Patent No.: US 12,602,564 B2
(45) Date of Patent: Apr. 14, 2026

(54) BIOMETRIC SMARTCARD MODULE

(71) Applicant: SMART PACKAGING SOLUTIONS, Rousset (FR)

(72) Inventor: Robert Mueller, Riemerling (DE)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 18/713,483

(22) PCT Filed: Nov. 29, 2022

(86) PCT No.: PCT/EP2022/083712
§ 371 (c)(1),
(2) Date: Oct. 22, 2024

(87) PCT Pub. No.: WO2023/094700
PCT Pub. Date: Jun. 1, 2023

(65) Prior Publication Data
US 2025/0028924 A1 Jan. 23, 2025

(30) Foreign Application Priority Data
Nov. 29, 2021 (GB) ..................................... 2117219

(51) Int. Cl.
*G06K 19/07* (2006.01)

(52) U.S. Cl.
CPC ..... *G06K 19/0718* (2013.01); *G06K 19/0707* (2013.01)

(58) Field of Classification Search
CPC ........... G06K 19/0718; G06K 19/0707; G06K 19/07754; G06K 19/07756; G06K 19/07722; G06K 19/07728; G06K 19/07769; G06Q 20/34; G06Q 20/401
See application file for complete search history.

(56) References Cited

U.S. PATENT DOCUMENTS

2019/0012588 A1* 1/2019 Lalo .................... H01L 21/4853
2021/0042759 A1* 2/2021 Larsen .................... G06F 21/32

FOREIGN PATENT DOCUMENTS

| EP | 392977 A1 | 10/1990 | |
| EP | 2 073 154 A2 | 6/2009 | |
| EP | 2073154 A1 * | 6/2009 | ......... G06K 19/0718 |
| EP | 3929779 A1 | 12/2021 | |
| WO | 2005/058004 A2 | 6/2005 | |
| WO | 2017/210305 A1 | 12/2017 | |

OTHER PUBLICATIONS

International Search Report and Written Opinion, PCT/EP2022/083712, dated Feb. 15, 2023 (15 pp.).
Search Report, GB2117219.2, dated Mrch 30, 2022 (3 pp.).

* cited by examiner

*Primary Examiner* — Kristy A Haupt
(74) *Attorney, Agent, or Firm* — Eversheds Sutherland (US) LLP

(57) ABSTRACT
An integrated circuit module is provided for post-lamination implanting into a smartcard body. The integrated circuit module includes a contact plate, a biometric sensor, a secure element, and means for electrical connection to an antenna embedded within the smartcard body. The secure element includes contact and contactless communication logic, and is configured to perform at least one smartcard function utilising the biometric sensor.

16 Claims, 4 Drawing Sheets

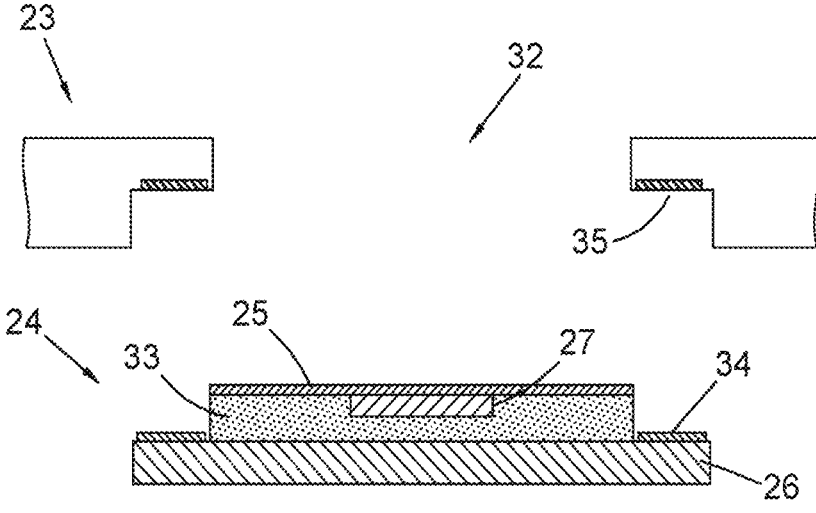
FIG. 7
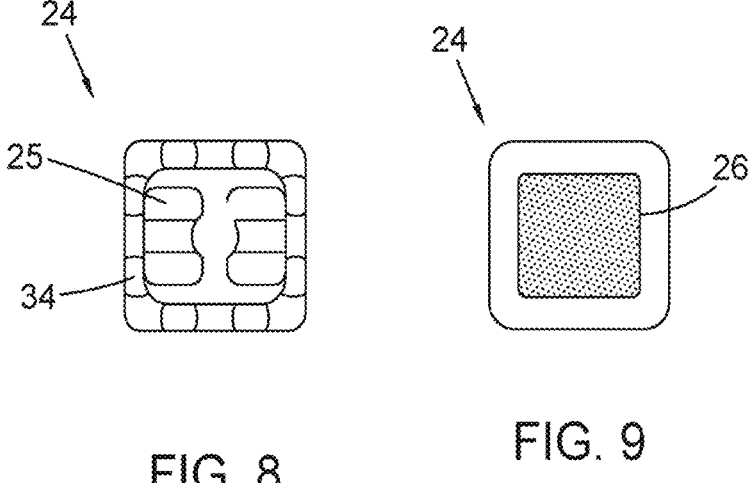
FIG. 8
FIG. 9

BIOMETRIC SMARTCARD MODULE

TECHNICAL FIELD

The present disclosure relates to an integrated circuit (IC) module for a biometrically-authorisable smartcard.

BACKGROUND OF THE INVENTION

Smartcards are widely used and include, for example, access cards, credit cards, debit cards, prepaid cards, loyalty cards, identity cards, and so on. Smartcards are electronic cards with the ability to store data and to interact with a bearer of the card and/or with outside devices, for example via contactless technologies such as near field communication (NFC). These smartcards can interact with readers to communicate information in order to enable access, to authorise transactions and so on.

Biometric authorisation such as fingerprint authorisation is becoming increasingly more commonly used with smartcard. Smartcards with complete, on-board biometric authorisation are called Biometric System-on-Card (BSoC, as defined in ISO/IEC 17839-1) devices and can interact with the user via integrated biometric capture devices (such as fingerprint sensors) in order to enable access to the secure features of the smartcard, for example in order to authorise financial transactions.

FIG. 1 shows, schematically, a common architecture for a biometrically-authorisable smartcard 100 used today. The smartcard 100 includes a fingerprint module 101 and an IC module 102, both of which are implanted post-lamination in a smartcard body 103. Both modules 101, 102 are soldered to wiring that was embedded within the smartcard body 103 during the lamination process. The wiring comprises interconnection wires 104, for transmission of data and power between the modules 101, 102, as well as an antenna 105 connected to the IC module 102 for harvesting power from an interfacing device (e.g. a point-of-sale terminal) and for contactless communication.

Whilst this architecture is effective, it is more costly and complex to produce than existing, non-biometrically-authorisable smartcards. This makes biometrically-authorisable smartcards undesirable for smartcard manufacturers, even despite the growing demand from customers for the increased security and convenience offered by such devices.

A need therefore exists for a biometrically-authorisable smartcard that can be produced in a simple and cost efficient manner.

SUMMARY OF THE INVENTION

The present invention provides an integrated circuit (IC) module for post-lamination implanting into a smartcard body, the module comprising: a secure element configured to perform at least one smartcard function, the secure element comprising contactless interface logic and contact interface logic; a contact plate defining a plurality of external contact pads configured to be exposed when the module has been implanted in the smartcard body, the contact plate being in communication with the secure element; and a biometric sensor comprising a sensor surface configured to be exposed when the module has been implanted in the smartcard body, the biometric sensor being in communication with the secure element.

By integrating the fingerprint sensor and secure element, only a single module needs to be implanted into the smartcard body when assembling the smartcard. This reduces the complexity of the manufacturing process, effectively halving the amount of processing (milling, implanting and activating the connection e.g. with heat-activated adhesive conductive film) required after lamination. It also reduces the manufacturing rejection rate and increases average product lifetimes, as the interconnections between the modules and the smartcard are a common site for manufacturing defects or failure in use.

Furthermore, producing a single, combined IC module may be cheaper than producing separate modules because only a single manufacturing process is required, and there may be cost effective ways to integrate elements of the secure element and fingerprint sensor, such as by manufacturing them on a single die.

The module may comprise antenna contact pads for conductive electrical connection to an antenna embedded within the smartcard body. Alternatively, or additionally, the module may comprise a module antenna for inductive electrical connection to an antenna embedded within the smartcard body.

Where a module antenna is used, the IC module may comprise a ferrite core to enhance coupling between the module antenna and the antenna embedded within the smartcard body.

The module may be configured to harvest power for the secure element via the antenna. The module may be configured to receive power for the secure element via the contact pads of the contact plate.

The secure element may be configured to communicate contactlessly via the antenna. The module may be configured to communicate via the contact pads of the contact plate.

Each of the contact pads may be in communication with the secure element. Optionally, the contact plate may further comprise one or more non-connected regions. For example, in some implementations, the C4 and C8 contact pads of the contact plate may not be used by the secure element, and therefore may not be connected to the secure element.

The contactless communication logic may permit communication in accordance with ISO/IEC 14443-3. The contact communication logic may permit communication in accordance with ISO/IEC 7816-3.

The at least one smartcard function may include validation for authorisation of an action, which may comprise a financial transaction.

The at least one smartcard function may include verification of a non-biometric identifying code, which may be received via the contact pads or via the antenna.

The at least one smartcard function may include verification of a biometric identifier presented to the biometric sensor. The verification may comprise comparing biometric data captured by the biometric sensor to reference biometric data, which may be prestored within the secure element.

The at least one smartcard function may include biometric enrolment of a user based on a biometric identifier presented to the biometric sensor. The biometric enrolment may comprise generating reference biometric data. The reference data may be generated based on a plurality of biometric data sets captured using the biometric sensor, where each data set corresponds to a presentation of the same biometric data to the biometric sensor.

The IC module may comprise a protective coating configured to be exposed when the module has been implanted in a smartcard body. The protective coating may cover the sensor surface of the biometric sensor. The protective coating may be configured to withstand insertion into a contact smartcard reader, and preferably repeated insertion into a contact smartcard reader. For example, the protective coating may be configured to withstand at least 1000 insertions into a smartcard reader.

The protective coating covering the sensor may be electrically insulating protective coating.

The protective coating may cover the contact pads. The protective coating covering the contact pads may be electrically conductive.

The biometric sensor may be a fingerprint sensor, and preferably a capacitive fingerprint sensor.

The sensor surface of the biometric sensor may be positioned on a same side of the IC module as the external contact pads. The sensor surface of the biometric sensor may be positioned between the external contact pads. The sensor surface may have a height of less than 10 mm and a width of less than 6 mm, and more specifically a height of less than 9.32 mm and a width of less than 5.62 mm. Thus, the sensor surface is capable of fitting within the space between the contact pad positions defined in ISO/IEC 7816-2.

Alternatively, the external contact pads may positioned on a first side of the IC module, and the sensor surface of the biometric sensor may be positioned on a second, opposite side of the IC module. Thus, both the first and second sides of the IC module may be configured to be exposed from the smartcard body when the IC module has been implanted in the smartcard body. Optionally, the IC module may be configured such that the first side of the IC module is implanted into the cavity of the smartcard body.

The module may have a thickness of less than 1 mm, and optionally less than 0.84 mm, which is the maximum thickness for an ISO/IEC 7810 smartcard with ID-1 form factor. In some embodiments, the thickness may be less than 0.6 mm.

The module may have a width of less than 20 mm, and optionally less than 15 mm.

The module may have a height of less than 20 mm, optionally less than 15 mm, and further optionally less than 10 mm.

The module may be packaged as a single component, i.e. configured for implantation into the smartcard as a single component.

The present invention further provides a biometrically-authorisable smartcard comprising: a smartcard body including a cavity; an antenna embedded within the smartcard body; and an IC module as described above implanted within the cavity of the smartcard body and in electrical communication with the antenna.

The smartcard may have a width of between 50 mm and 100 mm, for example between 85.47 mm and 85.72 mm, and a height of between 30 mm and 70 mm, for example between 53.92 mm and 54.03 mm. The smartcard may have a thickness less than 1 mm, and optionally less 0.84 mm, for example of about 0.76 mm (e.g. ±0.08 mm).

The smartcard may be an identification card in accordance with ISO/IEC 7810, and optionally an ID-1 identification card in accordance with ISO/IEC 7810.

The smartcard may be a payment card, such as a credit card, debit card, a prepaid card or other payment card. In other embodiments, the smartcard may be one of an access card, a loyalty card, and an identity card.

The smartcard body may comprise a laminated smartcard body, which may have been formed by a hot lamination process, for example involving temperatures above 100° C. or temperatures above 150° C. The smartcard body may be formed from a plastic material, such as PVC or Polycarbonate.

The IC module may be secured within the cavity by an adhesive, which may be an epoxy adhesive.

The present invention yet further provides a method of manufacturing a smartcard, the method comprising: forming, by a lamination process, a smartcard body including an antenna embedded therein; forming a cavity in the smartcard body; and implanting an IC module as described above into the cavity.

The lamination process may comprise a hot lamination process, which may comprise heating the smartcard body to a temperature above 100° C., or above 135° C. or above 150° C. Typically, hot lamination is performed at temperatures below 250° C.

The lamination process may optionally comprise applying pressure to the smartcard body whilst heating to these temperatures. The pressure may be at least 3 MPa, and optionally at least 5 MPa.

The cavity may be formed by removal of material, for example by milling. The milling may comprise laser milling.

The cavity may comprise a stepped cavity, for example being deeped at a centre of the cavity than at an edge of the cavity.

The cavity may extend fully through the smartcard body, i.e. so as to form a through-hole and so that the IC module is exposed on both sides of the smartcard body after being implanted. Alternatively, the cavity may extend only partially through the smartcard body, i.e. such that only one side of the IC module is exposed from the smartcard body after being implanted.

The method may comprise applying an adhesive to the cavity and/or the IC module before implanting the IC module. The adhesive may be a heat-activated adhesive conductive film.

The method may comprise conductively connecting the IC module to the antenna embedded within the smartcard body, for example by soldering or by a conductive adhesive, such as an anisotropic epoxy adhesive.

BRIEF DESCRIPTION OF THE DRAWINGS

Certain preferred embodiments will now be described in greater detail, by way of example only and with reference to the accompanying drawings, in which:

FIG. 7 shows a cross-section through an alternative IC module and a smartcard body;

FIG. 8 shows a rear view of the IC module of FIG. 7; and

FIG. 9 shows a front view of the IC module of FIG. 7.

DETAILED DESCRIPTION

Figure 1:
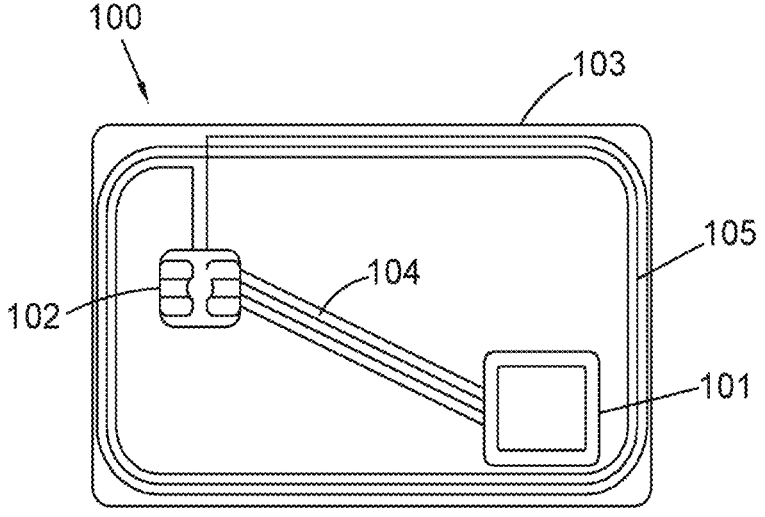
FIG. 1 shows a prior art architecture for a biometrically-authorisable smartcard.
Figure 2:
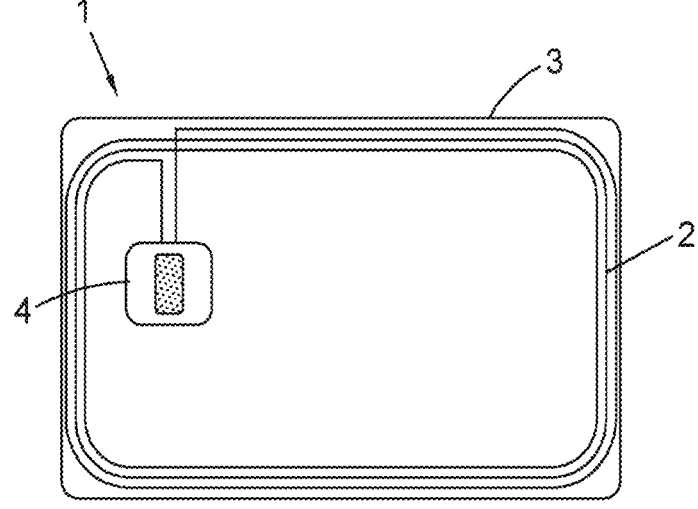
FIG. 2 show an architecture for a biometrically-authorisable smartcard according to the present disclosure.

The illustrated smartcard 1 is an ID-1 identification card in accordance with ISO/IEC 7810, having a width of about 86 mm, a height of about 54 mm, and a thickness of about 0.76 mm.

The smartcard 1 comprises an antenna 2 that is embedded within a smartcard body 3. The smartcard body 3 has been formed by a hot lamination process from, for example, PVC, such that the antenna 2 is encapsulated therein.

The smartcard body 3 further comprises a cavity 12, within which is implanted an IC module 4. The IC module 4 comprises a contact plate 5 defining a plurality of contact pads 5a, a fingerprint sensor 6, and a secure element 7.

The IC module 4 is in electrical communication with the antenna 2 in order to harvest power using the antenna 2 from a radio frequency (RF) excitation field. The IC module 4 includes contactless communication logic to permit communication via the antenna 2, for example in accordance with ISO/IEC 14443-3, and contact communication logic to permit communication via the contact plate 5 of the IC module 4, for example in accordance with ISO/IEC 7816-2 and/or ISO/IEC 7816-3. The communication logic permits the IC module 4 to establish secure communication with an appropriate smartcard reader (either a contactless or contact smartcard reader, respectively).

Figure 3:
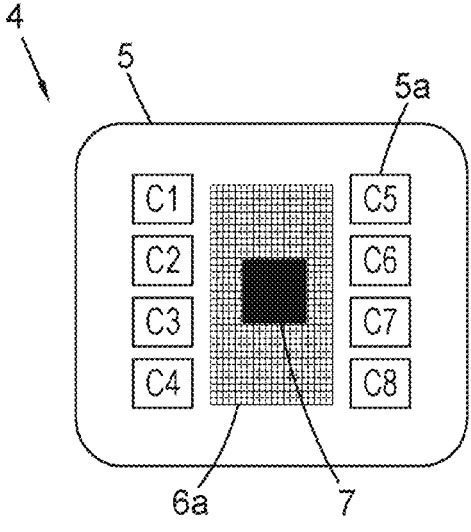
FIG. 3 shows an external surface of a first IC module for the smartcard of FIG. 2.
Figure 4:
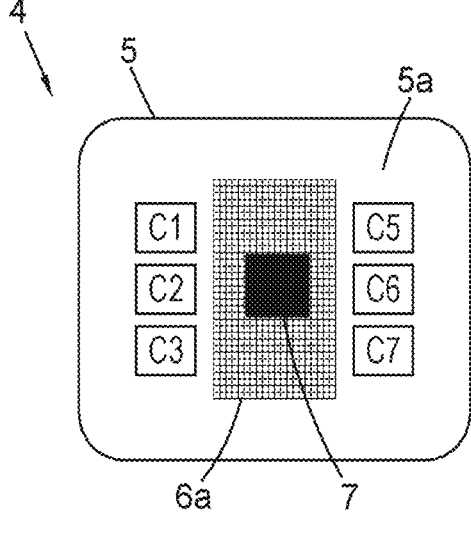
FIG. 4 shows an external surface of a second IC module for the smartcard of FIG. 3.

FIGS. 3 and 4 show two alternative configurations of the contact plate 5 of the IC module 4. In the first configuration, the IC module 4 includes eight contact pads 5a, and in the second configuration, the IC module 4 includes six contact pads 5a. The contact pads 5a in both configurations are arranged in accordance with ISO/IEC 7816-2.

A sensor area 6a of the fingerprint sensor 6 of the IC module 4 is provided between the contact pads 5a. The positions specified for the contact pads 5a in accordance with ISO/IEC 7816-2 leave a space of approximately 5.62 mm×9.32 mm. Traditionally, this region has been used to facilitate the mounting of the secure element 7 to the contact plate 5. However, this area is sufficient for a fingerprint sensor 6 to work reliably and to meet scheme certification requirements for payment smartcards.

The secure element 7 of the IC module 4 is mounted behind the fingerprint sensor 6, although other positions may be possible depending on the specific packaging design selected. The secure element 7 provides a secure processing environment, comprising a secure memory and a secure processor.

In addition to the communication logic, the secure element 7 is configured to perform various smartcard functions of the smartcard 1.

Typically, in a payment smartcard 1, the most important smartcard function of the secure element 7 is the validation for authorisation of a financial transaction. In other smartcards, the smartcard function may comprise validation for authorisation of another action, for example to permit access to a restricted area or the like.

Other smartcard functions include verification of the bearer of the smartcard 1, which may comprise either biometric verification, non-biometric verification, or a combination.

Biometric verification comprises capturing fingerprint data, such as minutiae data, from a finger of the card bearer presented to the fingerprint sensor 6, and comparing the captured fingerprint data to pre-stored reference fingerprint data.

Non-biometric verification may comprise verification of a non-biometric identifying code, such a PIN or password, supplied by the card bearer. The non-biometric identifying code would typically be received via the contact pads 5a, for example from a smartcard terminal. However, in other embodiments, the non-biometric identifying code could be received contactlessly via the antenna 2.

A further smartcard function comprises biometric enrolment of a bearer of the card. During biometric enrolment, the card bearer will repeatedly present a finger to the fingerprint sensor 6, which will capture a plurality of sets of fingerprint data, such as minutiae data. Based on the captured fingerprint data, the secure element 7 will create biometric reference data for use in future biometric verifications.

The IC module 4 is intended for use in a System-on-Card (BSoC) smartcard 1. Thus, the IC module 4 is configured so as not to transmit the biometric reference data off of the smartcard 1, and preferably the biometric reference data does not leave the secure processing environment of the secure element 7.

Figure 5:
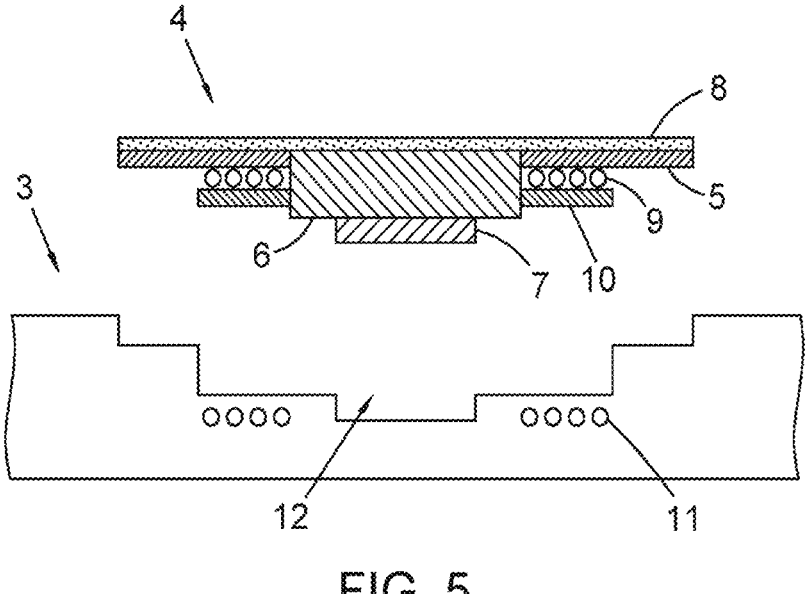
FIG. 5 shows a cross-section through an IC module and a smartcard body of the smartcard of FIG. 2.
Figure 6:
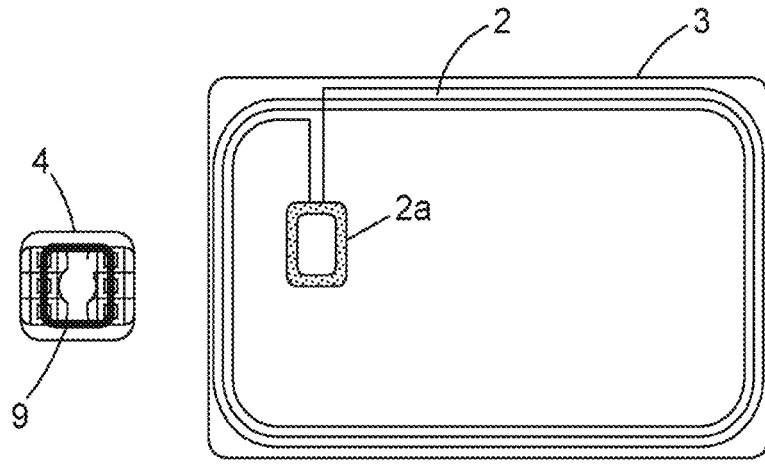
FIG. 6 shows details of the interface between the module and the architecture of FIG. 2.

FIG. 5 shows a cross-section through the IC module 4 and a portion of the smartcard body 3 including the cavity 12 for receiving the IC module 4.

The cavity 12 may be formed by any suitable method. For example, after forming the smartcard body 3 by lamination, the cavity 12 may be formed by removal of material from the card body, such as by milling. Laser milling is commonly used in the smartcard industry for forming such cavities.

The cavity 12 is sized to closely conform to the shape of the IC module 4. In the illustrated embodiment, the cavity 12 is a stepped cavity, which is lowest at is centre to receive the secure element 7 and fingerprint sensor 6. However, other shapes may be used as appropriate.

The contact plate 5 includes a hole in its centre that receives the fingerprint sensor 6. Below the fingerprint sensor is mounted the secure element 7. This can be realized by connecting a secure element die and fingerprint sensor die e.g. with flip-chip or bumping methodologies. The dies may be thinned down in advance, at the die level, in order to achieve a sufficiently thin IC module 4. The secure element 7 and fingerprint sensor 6 may be formed as separate silicon dies or a single silicon die.

A protective coating 8 is applied over the external surface of the fingerprint sensor 6 of the IC module 4. The protective coating 8 has a high scratch resistance and is an insulator where it covers the sensor area 6a of the fingerprint sensor 6. The protective coating 8 acts to protect the fingerprint sensor 6 when the smartcard 1 is inserted into a contact reader, as the contacts of the contact reader would otherwise rub over the sensor area 6a fingerprint sensor 6 causing potential damage.

Whilst the protective coating 8 may not be as hard wearing as, for example, the metals normally used for IC modules, it is nevertheless sufficient to protect the fingerprint sensor 6 because the vast majority of transactions performed using a biometrically authorisable smartcard 1 are performed contactlessly. Contact transactions are usually only used as a backup mode of operation, and in these cases fingerprint verification is not required.

In the illustrated embodiment, the protective coating 8 is also applied over the contact plate 5 to provide a uniform finish across the external surface of the IC module 4. Where the protective coating 8 covers the contact pads 5a, it is made electrically conductive.

The illustrated IC module 4 is configured as a coil on module (COM) IC module 4, and therefore comprises an integrated module antenna 9. The module antenna 9 is configured to inductively couple with a module-coupling portion 2a of the antenna 2 of the smartcard 1. The module-coupling portion 2a of the antenna 2 is sized to inductively couple with the module antenna 9.

The IC module 4 may comprise a ferrite core 10 adjacent the module antenna 9 to enhance the coupling between the module antenna 9 and the smartcard antenna 2.

The use of a module antenna 9 to electrically connect the IC module 4 to the smartcard antenna 2 advantageously simplifies the manufacture of the smartcard 1. It allows lower precision when milling the cavity 12, and additionally avoids the need to solder or otherwise physically connect the IC module 4 to the antenna 2. Instead, the IC module 4 may be secured within the cavity 12 using any suitable adhesive.

Furthermore, failure of such a physical connection over the life of the smartcard 1 represents a common failure modes of smartcard, and so by removing this physical connection, the lifetime of the smartcard 1 can be increased.

Of course, the IC module 4 may alternative be used with a physical connection. Thus, the IC module 4 may omit the module antenna 9 and may alternative comprise a pair of antenna contact pads for conductive electrical connection to the antenna 2. In such an embodiment, the antenna contact pads are located on the underside of the IC module, i.e. facing into the smartcard body 2.

The single biometric IC module 4 described in this disclosure is still easier to mount compared to the prior art solution illustrated in FIG. 1, because the total number of connections is reduced significantly from e.g. 6 at the ISO plate module 102 to only 2 for the single biometric module 4.

FIG. 7 to 9 illustrate an alternative design for a smartcard body 23 including a cavity 32, and an IC module 24 comprising a contact plate 25, a fingerprint sensor 26, and a secure element 27.

The IC module 24 shown in these figures functions similarly to the IC module 4 described above, and therefore only the differences will be described. Corresponding elements are indicated with the same reference sign, but incremented by 20, and the description above applies also to the corresponding elements of this IC module 24 unless stated to the contrary.

In this embodiment, the IC module 24 is designed to be implanted through the smartcard body 23. The cavity 32 therefore extends, at its centre, entirely through the smartcard body 23, and the contact plate 25 is formed on the side of the IC module 24 that will be inserted into the cavity 32.

In this embodiment, the fingerprint sensor 26 is formed on the opposite side of the IC module 24, so as to be exposed from the cavity 32 once the IC module 24 is implanted. Advantageously, this allows for the benefits of an IC module 24 including both a fingerprint sensor 26 and a secure element 27, whilst still permitting a comparatively large fingerprint sensor 26. It additionally removes the need for a protective coating 8 on the fingerprint sensor 26 because it will not be abraded by the contacts of a contact card reader during use. However, a protective coating (not shown) may nevertheless be applied to the contact plate 25 or the fingerprint sensor 26, if desired.

The IC module 24 is sized such that its thickness corresponds to the thickness of the smartcard body 23. Typically, this will be about 0.76 mm (e.g. ±0.08 mm). Thus, both the contact plate 25 and the sensor surface fingerprint sensor 26 are flush with the respective surfaces of the smartcard body 23. To achieve this, a filler material 33 may be used between the contact plate 25 and the fingerprint sensor 26.

The IC module 24 has a stepped configuration, with the fingerprint sensor 26 extending beyond the edges of the contact plate 25. Likewise, the cavity 32 has a corresponding stepped shape, such that a lip of the cavity 32 retains the edges of the fingerprint sensor 26.

In the illustrated embodiment, the IC module 24 comprises antenna contacts 34 configured to electrically connect to module contacts 35 of the smartcard body 23. The module contacts 35 are in turn in electrical connection with the embedded antenna (not shown). The antenna contacts 34 and the module contacts 35 may be electrically connected by any suitable technique, such as by soldering or using a conductive adhesive, such as an anisotropic conductive epoxy.

In other embodiments, the IC module 24 may be inductively connected to the antenna within the smartcard body, similar to the IC module 4 shown in the previous figures.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. An integrated circuit (IC) module for post-lamination implanting into a smartcard body, the module comprising:
   a secure element configured to perform at least one smartcard function, the secure element comprising contactless interface logic and contact interface logic;
   a contact plate defining a plurality of external contact pads configured to be exposed when the module has been implanted in the smartcard body, the contact plate being in communication with the secure element; and
   a biometric sensor comprising a sensor surface configured to be exposed when the module has been implanted in the smartcard body, the biometric sensor being in communication with the secure element;
   wherein the IC module is intended for use in a System-on-Card smartcard so as not to transmit the biometric reference data off of the smartcard.

2. A module according to claim 1, further comprising:
   antenna contact pads for conductive electrical connection to an antenna embedded within the smartcard body.

3. A module according to claim 2, wherein the module is configured to harvest power for the secure element and/or sensor via the antenna.

4. A module according to claim 2, wherein the secure element is configured to communicate contactlessly via the antenna.

5. A module according to claim 1, further comprising:
   a module antenna for inductive electrical connection to an antenna embedded within the smartcard body.

6. A module according to claim 1, wherein the at least one smartcard function includes:
   validation for authorisation of a financial transaction.

7. A module according to claim 1, wherein the at least one smartcard function includes:
   verification of a non-biometric identifying code received via the contact pads or the antenna; and
   verification of a biometric identifier presented to the biometric sensor.

8. A module according to claim 1, wherein the at least one smartcard function includes:
   biometric enrolment of a user based on a biometric identifier presented to the biometric sensor.

9. A module according to claim 1, wherein the sensor surface comprises a protective coating configured to be exposed when the module has been implanted in a smartcard body, the protective coating being configured to withstand insertion into a contact smartcard reader.

10. A module according to claim 9, wherein the protective coating is an electrically insulating protective coating.

11. A module according to claim 1, wherein the biometric sensor is a fingerprint sensor.

12. A module according to claim 1, wherein the module has a thickness of less than 1 mm, a width of less than 15 mm, and a height of less than 15 mm.

13. A module according to claim 1, wherein the sensor surface of the biometric sensor is positioned between the external contact pads, and has a height of less than 10 mm and a width of less than 6 mm.

14. A module according to claim 1, wherein the external contact pads are positioned on a first side of the IC module, and the sensor surface of the biometric sensor is positioned on a second, opposite side of the IC module.

15. A biometrically-authorisable smartcard comprising:

a smartcard body including a cavity;

an antenna embedded within the smartcard body; and an IC module according to claim 1 implanted within the cavity of the smartcard body and in electrical communication with the antenna.

16. A method of manufacturing a smartcard, the method comprising:

forming, by a lamination process, a smartcard body including an antenna embedded therein;

forming a cavity in the smartcard body; and implanting an IC module according to claim 1 into the cavity.

* * * * *